(12) United States Patent
Ding et al.

(10) Patent No.: US 10,275,635 B2
(45) Date of Patent: Apr. 30, 2019

(54) FINGERPRINT DETECTION CIRCUIT AND DRIVING METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Wei Liu, Beijing (CN); Pengpeng Wang, Beijing (CN); Changfeng Li, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 9 days.

(21) Appl. No.: 15/210,363

(22) Filed: Jul. 14, 2016

(65) Prior Publication Data

US 2017/0193267 A1 Jul. 6, 2017

(30) Foreign Application Priority Data

Jan. 4, 2016 (CN) .......................... 2016 1 0005882

(51) Int. Cl.
*G06K 9/28* (2006.01)
*G06K 9/00* (2006.01)
(52) U.S. Cl.
CPC ................................ *G06K 9/0004* (2013.01)

(58) Field of Classification Search
CPC .............................. G06K 9/00013–2009/0006
See application file for complete search history.

(56) References Cited

U.S. PATENT DOCUMENTS

| 6,882,164 B2 * | 4/2005 | Yano ..................... G06K 9/0002 324/663 |
| 9,864,897 B2 | 1/2018 | Ding et al. |

(Continued)

FOREIGN PATENT DOCUMENTS

| CN | 1266494 A | 9/2000 |
| CN | 101320974 A | 12/2008 |

(Continued)

OTHER PUBLICATIONS

"Light Sensing using LDR, Photodiode and Phototransistor", downloaded from http://www.electronicshub.org/lightsensors/#Light_Dependent_Resistor_LDR, dated Oct. 19, 2017, pp. 1-40, no listed author.*

(Continued)

*Primary Examiner* — Brian Werner
(74) *Attorney, Agent, or Firm* — Nath, Goldberg & Meyer; Joshua B. Goldberg; Daniel Bissing (57) ABSTRACT

Disclosed is a fingerprint detection circuit comprising at least one fingerprint detection unit, a high level signal line, a low level signal line and an output unit, the fingerprint detection unit includes a charging switch, a discharging switch and an input energy storing unit. An output terminal of the charging switch is connected to an input terminal of the discharging switch, a cathode of the photodiode is electrically connected to an input terminal of the charging switch, an output terminal of the discharging switch serves as an output terminal of the fingerprint detection unit, one terminal of the input energy storing unit is electrically connected to the output terminal of the charging switch, the other terminal of the input energy storing unit is electrically (Continued)

connected to the low level signal line, an input terminal of the output unit is electrically connected to the output terminal of the fingerprint detection unit.

20 Claims, 3 Drawing Sheets

(56) References Cited

U.S. PATENT DOCUMENTS

| | | | |
|---|---|---|---|
| 2008/0303705 | A1 | 12/2008 | Sakakibara |
| 2015/0270429 | A1* | 9/2015 | Jiroku .................. H01L 31/105 257/458 |
| 2017/0003770 | A1* | 1/2017 | Akhavan Fomani ... G06F 3/041 |
| 2017/0293791 | A1* | 10/2017 | Mainguet ........... G06K 9/00013 |

FOREIGN PATENT DOCUMENTS

| | | |
|---|---|---|
| CN | 103886281 A | 6/2014 |
| CN | 105046247 A | 11/2015 |
| WO | 9908121 A1 | 2/1999 |

OTHER PUBLICATIONS

Office Action for CN 201610005882.X dated May 23, 2018, with its English translation.

Second office action for CN201610005882.X and translation dated Aug. 10, 2018.

\* cited by examiner

FINGERPRINT DETECTION CIRCUIT AND DRIVING METHOD THEREOF, AND DISPLAY DEVICE

FIELD OF THE INVENTION

The present invention relates to the field of fingerprint detection technology, and particularly to a fingerprint detection circuit, a driving method of the fingerprint detection circuit and a display device including the fingerprint detection circuit.

BACKGROUND OF THE INVENTION

In order to improve the security of electronic apparatus, generally, a fingerprint identification device including a fingerprint detection circuit may be added to the electronic apparatus.

Figure 1:
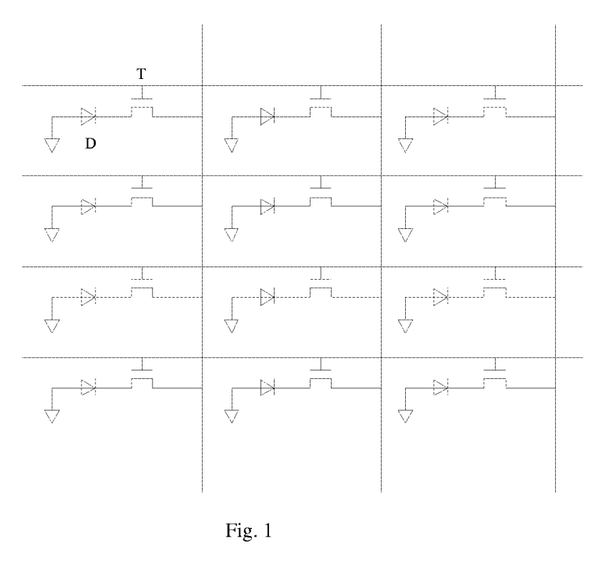
FIG. 1 is a diagram of a fingerprint detection circuit in the prior art.

FIG. 1 shows a fingerprint detection circuit performing fingerprint detection by using a photodiode. As shown in the figure, the fingerprint detection circuit comprises a plurality of fingerprint detection circuits, each of which includes a photodiode D and a switch transistor T. An anode of the photodiode is connected to a low level input terminal, a cathode of the photodiode is connected to a first electrode of the switch transistor T, a gate of the switch transistor T is connected to a gate line, and a second electrode of the switch transistor T serves as an output terminal of the fingerprint detection circuit.

Figure 2:
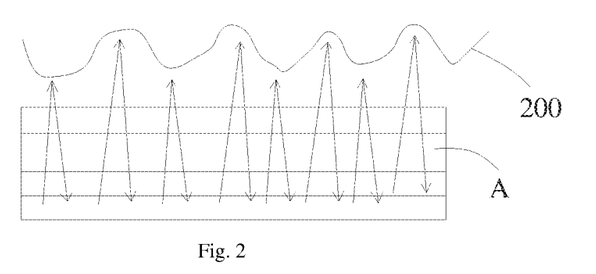
FIG. 2 is a principle diagram illustrating detection of the morphology of the fingerprint by the fingerprint detection circuit.

As shown in FIG. 2, the fingerprint detection circuit is provided in a layer A. When a finger 200 of an operator covers the fingerprint detection circuit of the fingerprint detection circuit, current passing through the photodiode may change, and the morphology of the fingerprint may be determined by detecting the change of the current of the photodiode.

However, in the above fingerprint detection circuit, when the finger of the operator covers the fingerprint detection circuit, difference between change of a photocurrent caused by a ridge of the fingerprint and that caused by a valley of the fingerprint is small. Therefore, it is impossible for the above fingerprint detection circuit to determine the morphology of the fingerprint accurately.

SUMMARY OF THE INVENTION

An object of the present invention is to provide a fingerprint detection circuit, a driving method of the fingerprint detection circuit and a display device including the fingerprint detection circuit. Accurate fingerprint detection result may be obtained by using the driving method to drive the fingerprint detection circuit to detect a fingerprint.

To achieve the above object, as one aspect of the present invention, there is provided a fingerprint detection circuit comprising at least one fingerprint detection circuit, a high level signal line and a low level signal line, the fingerprint detection circuit is provided therein with a photodiode, an anode of the photodiode is connected to the low level signal line, wherein the fingerprint detection circuit further comprises a charging switch, a discharging switch and an input energy storing circuit, the fingerprint detection circuit further comprises an output circuit including an output energy storing sub-circuit, an output terminal of the charging switch is electrically connected to an input terminal of the discharging switch, a cathode of the photodiode is electrically connected to an input terminal of the charging switch, an output terminal of the discharging switch serves as an output terminal of the fingerprint detection circuit, one terminal of the input energy storing circuit is electrically connected to the output terminal of the charging switch, the other terminal of the input energy storing circuit is electrically connected to the low level signal line, an input terminal of the output circuit is electrically connected to the output terminal of the fingerprint detection circuit, the output energy storing sub-circuit is configured for storing the power output from the output terminal of the fingerprint detection circuit, and the output energy storing sub-circuit is capable of discharging to the output terminal of the output circuit at a predetermined timing.

Preferably, both the charging switch and the discharging switch are thin film transistors, the fingerprint detection circuit further comprises a gate line group including a charging gate line and a discharging gate line, a first electrode of the charging switch serves as the input terminal of the charging switch, a second terminal of the charging switch serves as the output terminal of the charging switch, a gate of the charging switch is connected to the charging gate line, a first electrode of the discharging switch serves as the input terminal of the discharging switch, a second terminal of the discharging switch serves as the output terminal of the discharging switch, and a gate of the discharging switch is connected to the discharging gate line.

Preferably, the fingerprint detection circuit comprises a plurality of fingerprint detection circuits arranged in N rows, the fingerprint detection circuit comprises N gate line groups, each row of fingerprint detection circuits is connected with one gate line group, wherein N is a natural number larger than 1.

Preferably, the fingerprint detection circuits are arranged in M columns, the fingerprint detection circuit comprises M output lines, the M output lines and the M columns of fingerprint detection circuits are corresponding one-by-one, and output terminals of a same column of fingerprint detection circuits are connected with a corresponding output line, each output line corresponds to one output circuit, and the output line is electrically connected to the output terminal of a corresponding output circuit, wherein M is a natural number.

Preferably, the output circuit further comprises an operation amplifier and a short circuit switch, a first input terminal of the operation amplifier is electrically connected to the output line, a second input terminal of the operation amplifier is electrically connected to the low level signal line, one terminal of the output energy storing sub-circuit is electrically connected to an output terminal of the operation amplifier, the other terminal of the output energy storing sub-circuit is electrically connected to the first input terminal of the operation amplifier, the short circuit switch is connected with the output energy storing sub-circuit in parallel, and the short circuit switch is capable of being turned, on at a predetermined timing, so that two terminals of the output energy storing sub-circuit are shorted.

Preferably, the output energy storing sub-circuit comprises a feedback capacitor.

Preferably, the input energy storing circuit comprises a storage capacitor.

As another aspect of the present invention, there is provided a display device comprising the above fingerprint detection circuit.

As yet another aspect of the present invention, there is provided a driving method of the fingerprint detection circuit, wherein the driving method includes at least one operation period, for each fingerprint detection circuit, each operation period includes a plurality of charging sub-periods and a plurality of discharging sub-periods which alternate with each other:

during the charging sub-period, controlling the charging switch to be turned on, and controlling the discharging switch to be turned off, so as to charge the input energy storing circuit;

during the discharging sub-period, controlling the discharging switch to be turned off, and controlling the charging switch to be turned on, so that the input energy storing circuit charges the output energy storing sub-circuit;

at a timing when the operation period ends, controlling the output energy storing sub-circuit discharges to the output terminal of the output circuit.

Preferably, when the fingerprint detection circuit comprises a plurality of fingerprint detection circuits arranged in rows, operation periods of a same row of fingerprint detection circuits are synchronous, and operation periods between two adjacent rows of fingerprint detection circuits are staggered.

In a case of detecting the morphology of the fingerprint by using the fingerprint detection circuit provided by the present invention, when one operation period starting from the ridge of the fingerprint covering the fingerprint detection circuit ends, electric charge Q1 is accumulated in the output energy storing circuit. When one operation period starting from the valley of the fingerprint covering the fingerprint detection circuit ends, electric charge Q2 is accumulated in the output energy storing circuit. The electric charge Q1 and the electric charge Q2 are very different. Accordingly, when one operation period starting from the ridge of the fingerprint covering the fingerprint detection circuit ends, the output energy storing circuit discharges and generates a current I1. When one operation period starting from the valley of the fingerprint covering the fingerprint detection circuit ends, the output energy storing circuit discharges and generates a current I2. Since the electric charge Q1 and the electric charge Q2 are very different, the current I1 and current I2 are very different, which is equivalent to that multiple differences between the photocurrents are accumulated, so as to facilitate subsequent analysis of influences on the photocurrents in the above two cases by an analysis module, so as to more accurately determine the morphology of the fingerprint.

BRIEF DESCRIPTION OF THE DRAWINGS

The accompanying drawings are used to provide a further understanding of the invention, constitute a part of the specification, are used to interpret the invention in conjunction with the following embodiments, and do not limit the invention. In the drawings.

DESCRIPTION OF REFERENCE NUMERALS

100: output circuit
110: operation amplifier
200: finger

DETAILED DESCRIPTION OF THE EMBODIMENTS

Embodiments of the invention will be described in detail below in conjunction with the drawings. It should be understood that, the embodiments described herein are only used to illustrate and interpret the invention, and do not limit the invention.

In the present invention, current flowing through the photodiode is referred to as a photocurrent.

Figure 3:
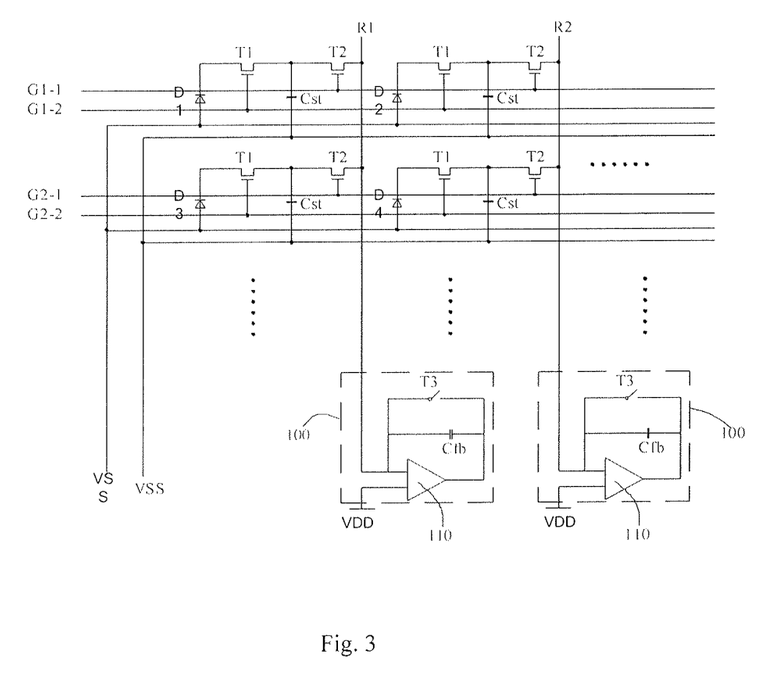
FIG. 3 is a diagram of a fingerprint detection circuit provided by the present invention.

In order to solve at least one problem in the prior art, as an aspect of the present invention, there is provided a fingerprint detection circuit, as shown in FIG. 3, the fingerprint detection circuit comprises at least one fingerprint detection circuit (FIG. 3 shows four fingerprint detection circuits thereamong), a high level signal line VDD and a low level signal line VSS. Each fingerprint detection circuit is provided therein with a photodiode (FIG. 3 shows a first photodiode D1 in the first row and the first column, a second photodiode D2 in the first row and the second column, a third photodiode D3 in the second row and the first column, a fourth photodiode D4 in the second row and the second column). An anode of the photodiode is electrically connected to the low level signal line VSS. The fingerprint detection circuit further comprises a charging switch T1, a discharging switch T2 and an input energy storing circuit. The fingerprint detection circuit further comprises an output circuit 100 including an output energy storing sub-circuit. As shown in FIG. 3, an output terminal of the charging switch T1 is electrically connected to an input terminal of the discharging switch T2, a cathode of the photodiode in the fingerprint detection circuit is electrically connected to an input terminal of the charging switch T1, an output terminal of the discharging switch T2 serves as an output terminal of the fingerprint detection circuit, one terminal of the input energy storing circuit is electrically connected to the output terminal of the charging switch T1, and the other terminal of the input energy storing circuit is electrically connected to the low level signal line VSS. An input terminal of the output circuit 100 is electrically connected to the output terminal of the fingerprint detection circuit, and the output energy storing sub-circuit is configured for storing the electric charge output from the output terminal of the fingerprint detection circuit. The output energy storing sub-circuit is capable of discharging to the output terminal of the output circuit at a predetermined timing.

In the present invention, the predetermined timing refers to a timing at which one operation period of one fingerprint detection circuit ends.

In the present invention, the fingerprint detection circuit may comprise one fingerprint detection circuit, or may comprise a plurality of fingerprint detection circuits.

In a case that the fingerprint detection circuit comprises one fingerprint detection circuit, the operator has to move his/her finger on the fingerprint detection circuit so as to ensure that a complete fingerprint can be detected.

In a case that the fingerprint detection circuit comprises a plurality of fingerprint detection circuits, the operator only needs to cover his/her finger on the fingerprint detection circuit.

When detecting fingerprint by using the fingerprint detection circuit, a driving method for driving the fingerprint detection circuit includes at least one operation period, each operation period includes a plurality of charging sub-periods and a plurality of discharging sub-periods which alternates with each other:

in the charging sub-period t1, controlling the charging switch T1 to be turned on, and controlling the discharging switch T2 to be turned off, so as to charge the input energy storing circuit.

in the discharging sub-period t2, controlling the discharging switch T1 to be turned off, and controlling the charging switch to be turned on, so that the input energy storing circuit discharges to the output terminal of the fingerprint detection circuit.

Electric charge discharged by the input energy storing circuit in the discharging sub-period t2 is directly or indirectly charged into the output energy storing sub-circuit.

Since each operation period includes a plurality of charging sub-periods t1 and a plurality of discharging sub-periods t2, after one operation period ends, much electric charge is accumulated in the output energy storing sub-circuit.

It should be understood by a person skilled in the art that, the current output by the fingerprint detection circuit when the ridge of fingerprint covers the fingerprint detection circuit is different from the currents output by the fingerprint detection circuit when the valley of fingerprint covers the fingerprint detection circuit and no fingerprint covers the fingerprint detection circuit.

In a case of detecting the morphology of the fingerprint by using the fingerprint detection circuit provided by the present invention, when one operation period starting from the ridge of the fingerprint covering the fingerprint detection circuit ends, electric charge Q1 is accumulated in the output energy storing circuit. When one operation period starting from the valley of the fingerprint covering the fingerprint detection circuit ends, electric charge Q2 is accumulated in the output energy storing circuit. The electric charge Q1 and the electric charge Q2 are very different. Accordingly, when one operation period starting from the ridge of the fingerprint covering the fingerprint detection circuit ends, the output energy storing circuit discharges and generates a current I1. When one operation period starting from the valley of the fingerprint covering the fingerprint detection circuit ends, the output energy storing circuit discharges and generates a current I2. Since the electric charge Q1 and the electric charge Q2 are very different, the current I1 and current I2 are very different, which is equivalent to that multiple differences between the photocurrents are accumulated, so as to facilitate subsequent analysis of influences on the photocurrents in the above two cases by an analysis module, so as to more accurately determine the morphology of the fingerprint.

Figure 5:
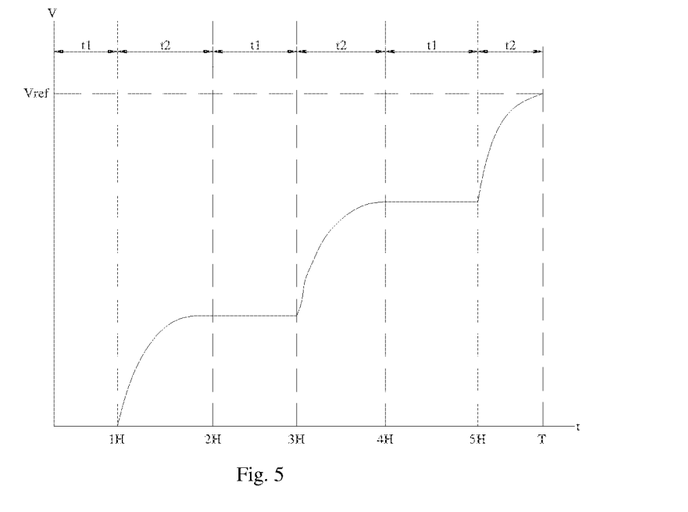
FIG. 5 is a graph illustrating variation of voltage of an output energy storing sub-circuit of an output circuit in the fingerprint detection circuit provided in the present invention over time.

FIG. 5 shows an implementation in which three charging sub-periods t1 and three discharging sub-periods t2 are included. In FIG. 5, H is duration of one charging sub-period or a discharging sub-period.

In the first charging sub-period t1, the charging switch T1 in the fingerprint detection circuit is turned on, so that the input energy storing circuit is charged. When a first discharging sub-period t2 starts after the first charging sub-period t1 ends, in the first discharging sub-period t2, the discharging switch T2 is turned on, the input energy storing circuit discharges through the output terminal of the fingerprint detection circuit, so as to charge the output energy storing sub-circuit.

When a second charging sub-period t1 starts after the first discharging sub-period t2 ends, in the second charging sub-period t1, the charging switch T1 is turned on again so as to continue to charge the input energy storing circuit. When a second discharging sub-period t2 starts after the second charging sub-period t1 ends, in the second discharging sub-period t2, the discharging switch T2 is turned on, the input energy storing circuit continues to discharge through the output terminal of the fingerprint detection circuit, so as to charge the output energy storing sub-circuit continuously.

When a third charging sub-period t1 starts after the second discharging sub-period t2 ends, in the third charging sub-period t1, the charging switch T1 is turned on again so as to continue to charge the input energy storing circuit. When a third discharging sub-period t2 starts after the third charging sub-period t1 ends, in the third discharging sub-period t2, the discharging switch T2 is turned on, the input energy storing circuit continues to discharge through the output terminal of the fingerprint detection circuit, so as to charge the output energy storing sub-circuit continuously.

After three charging sub-periods and three discharging sub-periods end, voltage difference between two terminals of the output energy storing sub-circuit reaches to Vref.

After the last discharging sub-period ends, the output energy storing sub-circuit connected with the output terminal of the output circuit starts to discharge. Since when detecting the fingerprint by using the fingerprint detection circuit provided by the present invention, variation of photocurrent caused by the ridge of the fingerprint and variation of photocurrent caused by the valley of the fingerprint are accumulated, thus difference between the output current when the ridge of the fingerprint covers the fingerprint detection circuit and the output current when the valley of the fingerprint covers the fingerprint detection circuit is enlarged, so that the morphology of the fingerprint covering the fingerprint detection circuit can be determined more accurately.

In the present invention, there is no limitation to the specific type of the charging switch and the discharging switch. In the embodiment shown in FIG. 3, both the charging switch T1 and the discharging switch T2 are thin film transistors. In order to facilitate to control the charging switch T1 and the discharging switch T2, preferably, the fingerprint detection circuit further comprises a gate line group including a charging gate line and a discharging gate line. A first electrode of the charging switch T1 serves as the input terminal of the charging switch T1, a second terminal of the charging switch T1 serves as the output terminal of the charging switch T1, a gate of the charging switch T1 is connected to the charging gate line. A first electrode of the discharging switch T2 serves as the input terminal of the discharging switch T2, a second terminal of the discharging switch T2 serves as the output terminal of the discharging switch T2, and a gate of the discharging switch T2 is connected to the discharging gate line.

In the charging sub-period, an active signal is supplied to the charging gate line, so that the charging switch T1 is turned on, and an inactive signal is supplied to the discharging gate line, so that the discharging switch T2 is turned off. In the discharging sub-period, an active signal is supplied to the discharging gate line, so that the discharging switch T2 is turned on, and an inactive signal is supplied to the charging gate line, so that the charging switch T1 is turned off.

In the embodiment shown in FIG. 3, a first gate line group includes a charging gate line G1-2 and a discharging gate line G1-1, and a second gate line group includes a charging gate line G2-2 and a discharging gate line G2-1.

As described above, the fingerprint detection circuit may comprise one fingerprint detection circuit, or may also comprise a plurality of fingerprint detection circuits.

In order to accurately detect the morphology of the fingerprint, preferably, the fingerprint detection circuit may comprise a plurality of fingerprint detection circuits. As a preferable embodiment of the present invention, the plurality of fingerprint detection circuits are arranged in N rows, the fingerprint detection circuit comprises N gate line groups, each row of fingerprint detection circuits are connected with one gate line group, wherein N is a natural number larger than 1.

Figure 4:
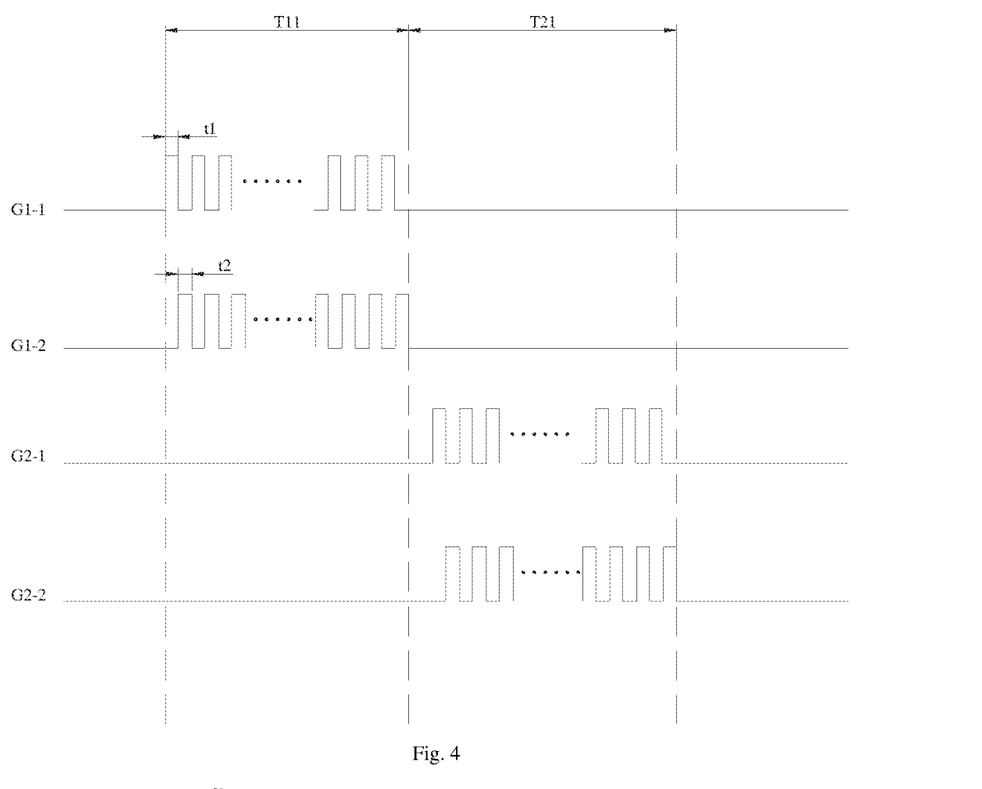
FIG. 4 is a sequence chart of signals of the fingerprint detection circuit provided by the present invention.

In order to facilitate the control, 2N gate lines in the N rows of fingerprint detection circuits are scanned row-by-row, so that the fingerprint detection circuits in different rows are controlled in different operation periods, respectively. As shown in FIG. 4, during the operation period T11, a periodic pulse signal is applied to the charging gate line and the discharging gate line in the first gate line group, during the operation period T21, a periodic pulse signal is applied to the charging gate line and the discharging gate line in the second gate line group. It can be seen from FIG. 4 that, during a same operation period, the periodic pulse signal applied to the charging gate line is 180° out-of-phase with respect to the periodic pulse signal applied to the discharging gate line are.

In order to facilitate to output signal, preferably, the fingerprint detection circuits are arranged in M columns, the fingerprint detection circuit comprises M output lines, the M output lines and the M columns of fingerprint detection circuits are corresponding one-by-one, and output terminals of a same column of fingerprint detection circuits are connected with a corresponding output line, each output line corresponds to one output circuit 100, and the output line is electrically connected to the output terminal of a corresponding output circuit 100, wherein M is a natural number.

In the embodiment shown in FIG. 3, two output lines are shown, that is, a first output line R1 and a second output line R2. When the first row of fingerprint detection circuits are scanned, the fingerprint detection circuits in the first row output through respective output lines, and when the second row of fingerprint detection circuits are scanned, the fingerprint detection circuits in the second row output through respective output lines, and so on.

In the present invention, there is no specific limitation to the output circuits. In the embodiment shown in FIG. 3, the output circuit 100 comprises an operation amplifier 110, an output energy storing sub-circuit and a short circuit switch T3. As shown in FIG. 3, a first input terminal of the operation amplifier 110 is electrically connected to the output line, and a second input terminal of the operation amplifier 110 is electrically connected to the low level signal line VSS. One terminal of the output energy storing sub-circuit is electrically connected to an output terminal of the operation amplifier 110, the other terminal of the output energy storing sub-circuit is electrically connected to the first input terminal of the operation amplifier 110, the short circuit switch T3 is connected with the output energy storing sub-circuit in parallel, and the short circuit switch T3 is capable of being turned on at a predetermined timing, so that two terminals of the output energy storing sub-circuit are shorted. It should be understood that, as for the short circuit switches T3 of the output circuits 100 corresponding to the fingerprint detection circuits in different columns, the predetermined timings are different.

In the present invention, there is no specific limitation to the output energy storing sub-circuit. In the preferable embodiment of the present invention, the output energy storing sub-circuit comprises a feedback capacitor Cfb.

In the present invention, there is no specific limitation to the input energy storing circuit. In the preferable embodiment of the present invention, the input energy storing circuit comprises a storage capacitor Cst.

As another aspect of the present invention, there is provided a display device, which comprises a fingerprint detection circuit, wherein the fingerprint detection circuit is the above fingerprint detection circuit provided by the present invention.

In the present invention, the fingerprint detection circuits of the fingerprint detection circuit may be provided within a region outside the display region of the display device. Alternatively, the fingerprint detection circuits of the fingerprint detection circuit may be provided within the display region. For example, the fingerprint detection circuits may be provided in the pixel circuits in the display region.

As a yet aspect of the present invention, there is provided a driving method of the above fingerprint detection circuit, and the driving method includes at least one operation period, for each fingerprint detection circuit, each operation period includes a plurality of charging sub-periods and a plurality of discharging sub-periods which alternate with each other:

during the charging sub-period, controlling the charging switch to be turned on, and controlling the discharging switch to be turned off, so as to charge the input energy storing circuit;

during the discharging sub-period, controlling the charging switch to be turned off, and controlling the discharging switch to be turned on, so that the input energy storing circuit charges the output energy storing sub-circuit;

at a timing when the operation period ends, controlling the output energy storing sub-circuit to discharge to the output terminal of the output circuit.

Preferably, when the fingerprint detection circuit comprises a plurality of fingerprint detection circuits arranged in rows, operation periods of a same row of fingerprint detection circuits are synchronous, operation periods between two adjacent rows of fingerprint detection circuits are staggered. As shown in FIG. 4, the operation period T11 of the first row of fingerprint detection circuits and the operation period T21 of the second row of fingerprint detection circuits are staggered.

It can be understood that the foregoing implementations are merely exemplary implementations used for describing the principle of the present application, but the present application is not limited thereto. Those of ordinary skill in the art may make various variations and improvements without departing from the spirit and essence of the present application, and these variations and improvements shall fall into the protection scope of the present application.

The invention claimed is:

1. A fingerprint detection circuit comprising at least one fingerprint detection unit, a high level signal line and a low level signal line, the fingerprint detection unit is provided therein with a photodiode, an anode of the photodiode is electrically connected to the low level signal line, wherein the fingerprint detection unit further comprises a charging switch, a discharging switch and an input energy storing unit, the fingerprint detection circuit further comprises an output unit including an output energy storing sub-unit, an output terminal of the charging switch is electrically connected to an input terminal of the discharging switch, a cathode of the photodiode is electrically connected to an input terminal of the charging switch, an output terminal of the discharging switch serves as an output terminal of the fingerprint detection unit, one terminal of the input energy storing unit is electrically connected to the output terminal of the charging switch, the other terminal of the input energy storing unit is electrically connected to the low level signal line, an input terminal of the output unit is electrically connected to the output terminal of the fingerprint detection unit, the output energy storing sub-unit is configured for storing the electric charge output from the output terminal of the fingerprint detection unit, and the output energy storing sub-unit is capable of discharging to the output terminal of the output unit at a predetermined timing, and wherein the charging switch and the discharging switch are turned on alternatively for a plurality of charging sub-periods and discharging sub-periods to charge the output energy storing sub-unit during one operational period, during each of the charging sub-periods and discharging sub-periods, a periodic pulse signal applied to the charging switch is always 180 degree out-of-phase with respect that applied to the discharging switch, and during the charging sub-period, the charging switch is controlled to be turned on, and the discharging switch is controlled to be turned off, so as to charge the input energy storing unit;

during the discharging sub-period, the charging switch is controlled to be turned off, and the discharging switch is controlled to be turned on, so that the input energy storing unit charges the output energy storing sub-unit.

2. The fingerprint detection circuit of claim 1, wherein both the charging switch and the discharging switch are thin film transistors, the fingerprint detection circuit further comprises a gate line group including a charging gate line and a discharging gate line, a first electrode of the charging switch serves as the input terminal of the charging switch, a second terminal of the charging switch serves as the output terminal of the charging switch, a gate of the charging switch is connected to the charging gate line, a first electrode of the discharging switch serves as the input terminal of the discharging switch, a second terminal of the discharging switch serves as the output terminal of the discharging switch, and a gate of the discharging switch is connected to the discharging gate line.

3. The fingerprint detection circuit of claim 2, wherein the fingerprint detection circuit comprises a plurality of fingerprint detection units arranged in N rows, the fingerprint detection circuit comprises N gate line groups, each row of fingerprint detection units is connected with one gate line group, wherein N is a natural number larger than 1.

4. The fingerprint detection circuit of claim 2, wherein the fingerprint detection units are arranged in M columns, the fingerprint detection circuit comprises M output lines, the M output lines and the M columns of fingerprint detection units are corresponding one-by-one, and output terminals of a same column of fingerprint detection units are connected with a corresponding output line, each output line corresponds to one output unit, and the output line is electrically connected to the output terminal of a corresponding output unit, wherein M is a natural number.

5. The fingerprint detection circuit of claim 3, wherein the fingerprint detection units are arranged in M columns, the fingerprint detection circuit comprises M output lines, the M output lines and the M columns of fingerprint detection units are corresponding one-by-one, and output terminals of a same column of fingerprint detection units are connected with corresponding output lines, each output line corresponds to one output unit, and the output line is electrically connected to the output terminal of a corresponding output unit, wherein M is a natural number.

6. The fingerprint detection circuit of claim 4, wherein the output unit further comprises an operation amplifier and a short circuit switch, a first input terminal of the operation amplifier is electrically connected to the output line, a second input terminal of the operation amplifier is electrically connected to the low level signal line, one terminal of the output energy storing sub-unit is electrically connected to an output terminal of the operation amplifier, the other terminal of the output energy storing sub-unit is electrically connected to the first input terminal of the operation amplifier, the short circuit switch is connected with the output energy storing sub-unit in parallel, and the short circuit switch is capable of being turned on at a predetermined timing, so that two terminals of the output energy storing sub-unit are shorted.

7. The fingerprint detection circuit of claim 5, wherein the output unit further comprises an operation amplifier and a short circuit switch, a first input terminal of the operation amplifier is electrically connected to the output line, a second input terminal of the operation amplifier is electrically connected to the low level signal line, one terminal of the output energy storing sub-unit is electrically connected to an output terminal of the operation amplifier, the other terminal of the output energy storing sub-unit is electrically connected to the first input terminal of the operation amplifier, the short circuit switch is connected with the output energy storing sub-unit in parallel, and the short circuit switch is capable of being turned on at a predetermined timing, so that two terminals of the output energy storing sub-unit are shorted.

8. The fingerprint detection circuit of claim 6, wherein the output energy storing sub-unit comprises a feedback capacitor.

9. The fingerprint detection circuit of claim 7, wherein the output energy storing sub-unit comprises a feedback capacitor.

10. The fingerprint detection circuit of claim 1, wherein the input energy storing unit comprises a storage capacitor.

11. The fingerprint detection circuit of claim 2, wherein the input energy storing unit comprises a storage capacitor.

12. The fingerprint detection circuit of claim 3, wherein the input energy storing unit comprises a storage capacitor.

13. A display device comprising the fingerprint detection circuit of claim 1.

14. A display device comprising the fingerprint detection circuit of claim 2.

15. A display device comprising the fingerprint detection circuit of claim 3.

16. A display device comprising the fingerprint detection circuit of claim 4.

17. A driving method of the fingerprint detection circuit of claim 1, the driving method includes at least one operation period, for each fingerprint detection unit, each operation period includes the plurality of charging sub-periods and the plurality of discharging sub-periods which alternate with each other:

during the charging sub-period, controlling the charging switch to be turned on, and controlling the discharging switch to be turned off, so as to charge the input energy storing unit;

during the discharging sub-period, controlling the charging switch to be turned off, and controlling the discharging switch to be turned on, so that the input energy storing unit charges the output energy storing sub-unit;

at a timing when the operation period ends, controlling the output energy storing sub-unit to discharge to the output terminal of the output unit.

18. The driving method of claim 17, wherein when the fingerprint detection circuit comprises a plurality of fingerprint detection units arranged in rows, operation periods of a same row of fingerprint detection units are synchronous, and operation periods between two adjacent rows of fingerprint detection units are staggered.

19. A driving method of the fingerprint detection circuit of claim 2, and the driving method includes at least one operation period, for each fingerprint detection unit, each operation period includes the plurality of charging sub-periods and the plurality of discharging sub-periods which alternate with each other:

during the charging sub-period, controlling the charging switch to be turned on, and controlling the discharging switch to be turned off, so as to charge the input energy storing unit;

during the discharging sub-period, controlling the discharging switch to be turned on, and controlling the charging switch to be turned off, so that the input energy storing unit charges the output energy storing sub-unit;

at a timing when the operation period ends, controlling the output energy storing sub-unit to discharge to the output terminal of the output unit.

20. The driving method of claim 19, wherein when the fingerprint detection circuit comprises a plurality of fingerprint detection units arranged in rows, operation periods of a same row of fingerprint detection units are synchronous, and operation periods between two adjacent rows of fingerprint detection units are staggered.

* * * * *